E. CHRISTENSEN.
PACKING.
APPLICATION FILED NOV. 26, 1909.
1,031,323.
Patented July 2, 1912.
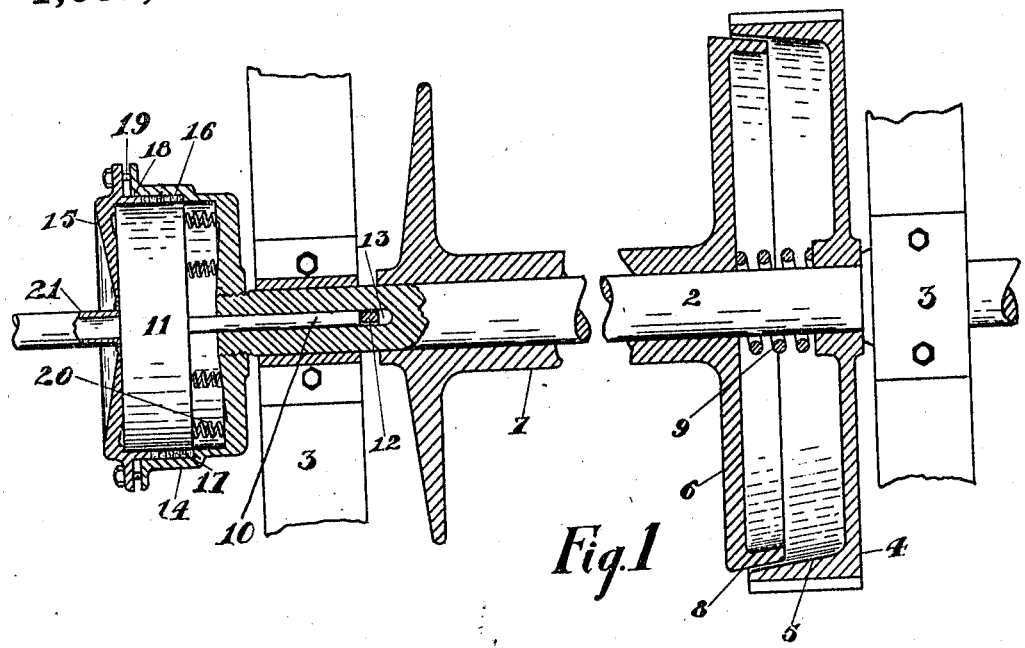
Fig. 1
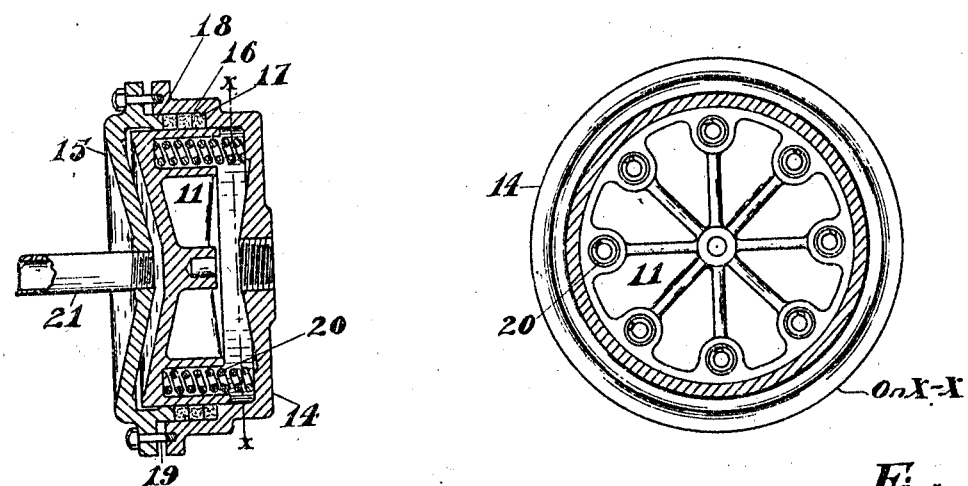
Fig. 2
Fig. 3
Witnesses
Inventor
Emil Christensen
Attorney.

UNITED STATES PATENT OFFICE.

EMIL CHRISTENSEN, OF PORTLAND, OREGON.

PACKING.

1,031,323.  Specification of Letters Patent.  Patented July 2, 1912.

Application filed November 26, 1909. Serial No. 530,025.

*To all whom it may concern:*

Be it known that I, EMIL CHRISTENSEN, of Portland, Multnomah county, Oregon, have invented certain new and useful Improvements in Packing, of which the following is a specification.

My invention relates to friction clutches and particularly those of the steam operative type.

The object of the invention is to provide means whereby leakage of steam around the piston will be greatly reduced, if not entirely eliminated. Generally in mechanisms of this kind a number of piston rings have been mounted on the piston itself, but these rings have been unsatisfactory and will allow leakage even when fitted very tightly around the piston.

My invention consists in introducing a compressible packing in the walls of the cylinder, one of the cylinder heads being rendered adjustable and seated against the packing to allow for compression.

In the accompanying drawings forming part of this specification, Figure 1 is a detail sectional view of a fluid pressure operative friction clutch embodying my invention, Fig. 2 is a sectional view of the cylinder and piston, showing the position of the packing and springs therein, Fig. 3 is a transverse sectional view through the cylinder.

In the drawing, 2 represents a shaft having bearings 3 and a gear wheel 4 provided with a friction surface 5. 6 is a disk provided on one end of a drum 7 and having a friction surface 8 to engage the tapered surface of the wheel 4. The drum is adapted to slide back and forth on the shaft toward and from the wheel 4 and is normally held out of engagement with the friction surface 5 by a spring 9. The end of the shaft 2 is bored to receive a stem 10 of a piston 11 and a pin 12 fits within a transverse slot 13 in said shaft in the path of the stem 10, and is adapted to engage the end of the drum 7 and force it inwardly toward the ring 4. A cylinder 14 is mounted on the end of the shaft 2 and has a removable head 15. The wall of said cylinder has an annular recess 16 wherein compressible packing rings 17 are arranged, composed preferably of hemp. The head 15 has a flange 18 that is adapted to bear on these hemp rings and bolts 19 pass through said head and into the walls of the cylinder, serving to draw the cylinder head snugly against the packing rings until the desired degree of compression thereon is obtained. The piston 11 has preferably a concave outer face corresponding to the form of the cylinder head and bears on the compressible packing rings sufficient friction being generated between these rings and the piston to render the piston rather difficult of movement especially at start. I therefore provide a series of coiled springs 20 which are put under compression when the piston is forced inwardly to aid in returning it to its normal inoperative position and also to absorb the shock to the mechanism when admitting full pressure on piston too sudden. I have shown eight of these springs in Fig. 3, but a greater or less number may be provided, as desired. The degree of compression between the packing rings and the piston can be increased or decreased according to the compression exerted on the packing rings by the head of the cylinder. Steam or other fluid pressure is introduced in the rear of the piston through a suitable pipe 21. By providing a suitable number of these compressible packing rings, preferably of the hemp type, I am able to render the piston practically steam tight and thereby eliminate a large part of the annoyance and delay incidental to the operation of a device of this kind.

I have shown the packing used in connection with a steam cylinder for a friction clutch, but do not confine myself to such use as it will be found of great advantage wherever a steam tight packing around a piston is required.

I claim as my invention:—

1. The combination, with a cylinder having an annular recess in its walls, and compressible packing rings fitting within said recess, of a head for said cylinder having a flange to bear on said rings, the pressure of said flange operating to expand said rings, and a piston in said cylinder inclosed by said rings and against the surface of which said rings are forced by the compression of said flange.

2. The combination, with a cylinder having an annular recess in its walls and compressible packing rings fitting within said cylinder, of a piston for said cylinder adapted to slide within said rings and means for applying pressure to said rings to expand them and increase their pressure on said piston.

3. The combination, with a cylinder and piston, of a compressible packing arranged within said cylinder, the inner surface of said packing being flush substantially with the inner surface of said cylinder, a head having a bearing on said packing and operating to compress the same and force it against the surface of said piston, and means for increasing or decreasing the pressure of said head on said packing.

In witness whereof, I have hereunto set my hand this 15th day of November 1909.

EMIL CHRISTENSEN.

Witnesses:
W. H. CORBETT,
ELIJAH CORBETT.